United States Patent [19]

Nelson

[11] 4,065,223
[45] Dec. 27, 1977

[54] DISPOSABLE CUTTING INSERT AND TOOL HOLDER THEREFOR

[76] Inventor: Stanford C. Nelson, 8 S. Merrill Ave., Park Ridge, Ill. 60068

[21] Appl. No.: 600,264

[22] Filed: July 31, 1975

[51] Int. Cl.² .......................... B26D 1/00; B23B 29/00
[52] U.S. Cl. ..................................... 407/114; 82/36 R
[58] Field of Search .................... 29/95, 96, 97; 82/36

[56] References Cited

U.S. PATENT DOCUMENTS

| | | | |
|---|---|---|---|
| 2,659,962 | 11/1953 | Doerseln | 29/96 |
| 2,903,781 | 9/1959 | Hudson | 29/96 |
| 2,949,662 | 8/1960 | Cook et al. | 29/96 |
| 3,136,031 | 6/1964 | Cassidy | 29/97 |
| 3,137,917 | 6/1964 | Dowd | 29/95 R |
| 3,229,349 | 1/1966 | Leksell | 29/96 X |
| 3,395,434 | 8/1968 | Wirfelt | 29/95 R |
| 3,492,708 | 2/1970 | Dombrowski | 29/96 |
| 3,621,549 | 11/1971 | Billups | 29/96 |

Primary Examiner—Harrison L. Hinson
Attorney, Agent, or Firm—Hill, Gross, Simpson, Van Santen, Steadman, Chiara & Simpson

[57] ABSTRACT

An indexible carbide cutting tool insert and tool holder therefor providing a plurality of right-angled cutting edges positioned to finish cut journals at a negative back rake angle of 1° to 4° with a negative side rake angle of 1° to 4° and with an end relief angle and side relief angle of not less than 1°. The cutting edges include nose cutting radius portions for contour cutting, finish cutting flats and side cutting portions to provide a single indexible insert with the capability of performing a complete machining operation in the finish turning of bearing journals. Chip-breakers are provided to cooperate with each of the cutting edge portions to prevent the formation of long, continuous chips, which are customarily formed in connection with turning steel at high speeds especially with the use of carbide cutting tools.

3 Claims, 12 Drawing Figures

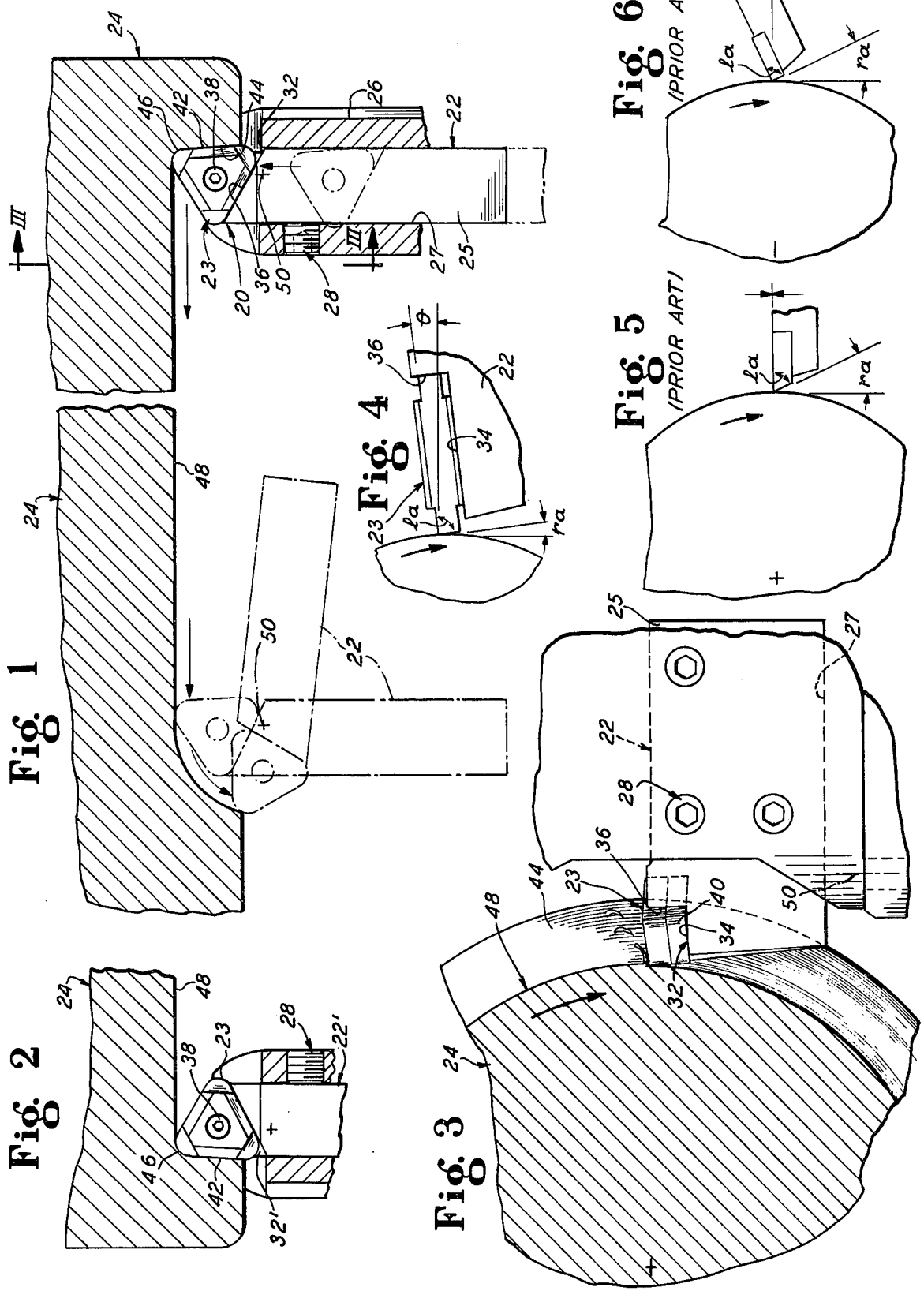

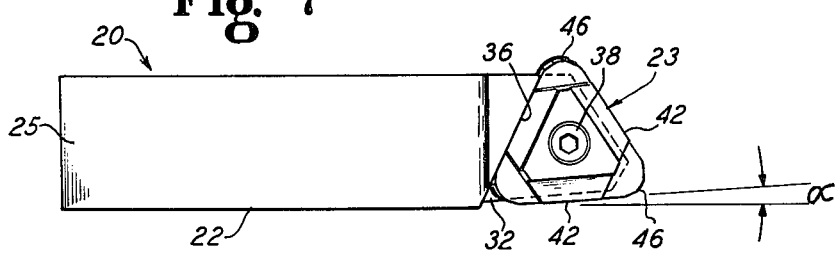
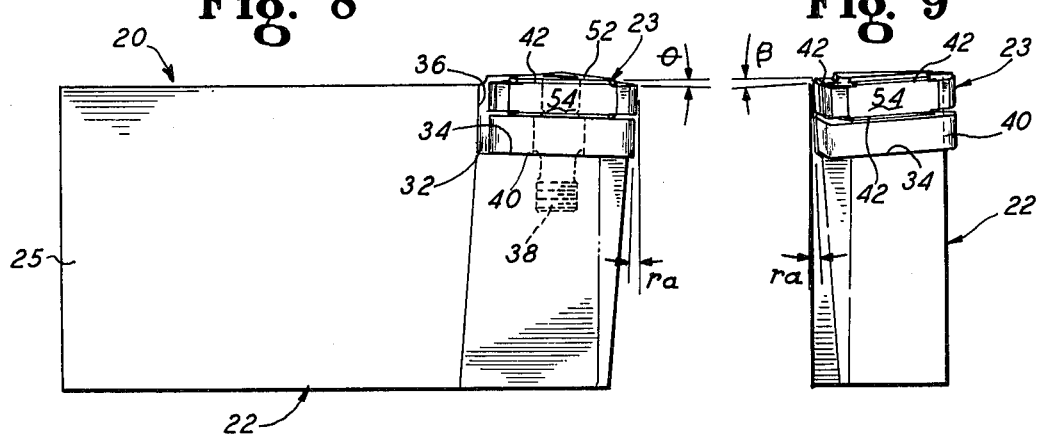
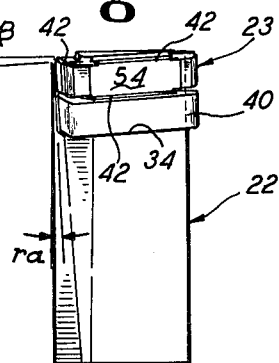
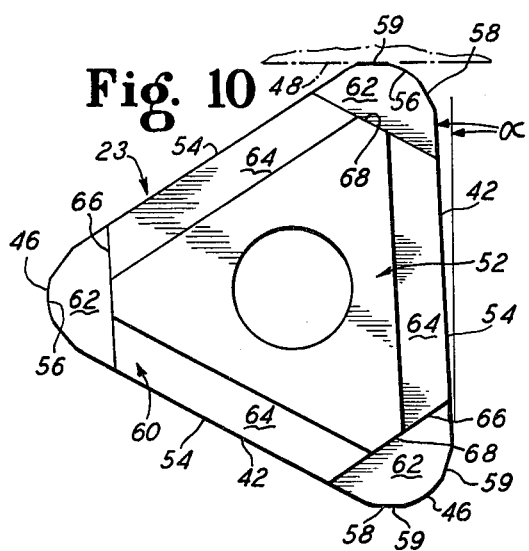
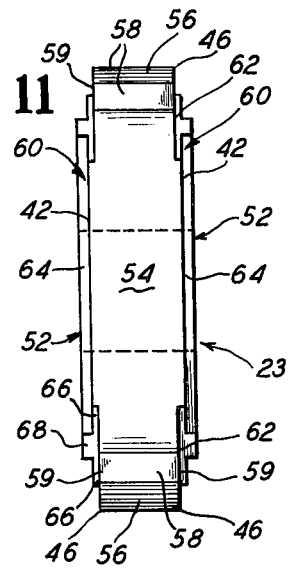
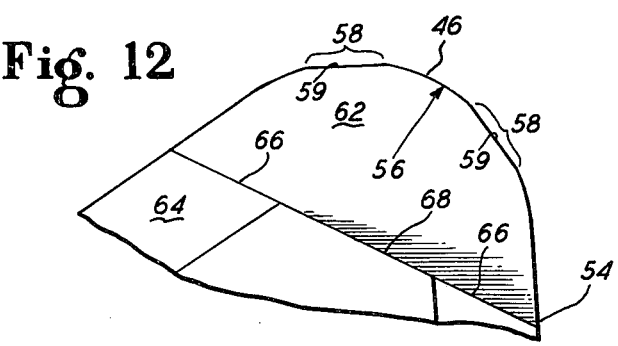

DISPOSABLE CUTTING INSERT AND TOOL HOLDER THEREFOR

BACKGROUND OF THE INVENTION

The use of carbide tipped cutting tools has greatly advanced machining practices in recent years due to the advantages brought about with the introduction of replaceable carbide inserts for the cutting tools, to provide a plurality of cutting edges on each insert which are indexibly supported on a tool holder in a suitable cutting orientation. These replaceable inserts eliminate the need to resharpen the cutting edges and typically include 90° lip angles, providing mechanically strong cutting edges for the brittle carbide inserts. The turning applications of these indexible carbide inserts, however, have been somewhat limited until the present invention. Due to the turn-over and rotational procedure for indexing the inserts to accommodate the placing of each of the cutting edges in an operable cutting position, all of the cutting edges must be identical, necessitating 90° lip angles.

Since it has long been settled and fully accepted by those skilled in the art, as exemplified by engineering handbooks and trade publications, that the "standard" relief angle of 6° is virtually a mandatory minimum clearance angle and by fixing the relief angle as not less than 6°, a cutting angle of 96° or more is automatically set which places the rake angle at a negative rake of 6° or more. It has been shown that such a severe negative rake angle could be tolerated only in some turning operations, but could not produce the high quality finish required for wheel bearing journals.

Typically, in attempting to overcome this difficulty, as shown in the patent to E. G. Lundgren, U.S. Pat. No. 3,882,580, a special tapered chip-breaker is formed about the edge of the insert to provide a positive back rake angle to the detriment, however, of the stronger 90° lip angle and at a considerable expense and effort required to generate the complicated chip-breaker so as not to deviate from the untouchable minimum "standard" relief angle of 6°.

Since the life of a plain bearing supported on a journal surface is directly related to the quality of its machined finish, the use of these inserts has been unsuitable up to the development of the present invention and conventional types of turning tools have been necessarily utilized to obtain high quality journal finishes.

SUMMARY OF THE INVENTION

The present invention provides a turning tool utilizing a three-sided, indexible and invertible carbide cutting tool insert with right-angled cutting edges, used with a special tool holder particularly suited for the finish turning of outside journals on mounted railway car wheel sets. The use of these turning tools with a "throw-away" carbide insert reduces tool cost for each journal finish cut, reduces time losses in tool changing and eliminates expensive tool resharpening associated with ordinary turning tools.

The present invention produces an excellent finished journal surface which is compatible with the quality requirements for bearing journals and has received commercial acceptance for the machining thereof. The improved cutting performance was unexpectedly obtained by providing a tool holder to support the carbide insert at a negative back rake angle to only $1\frac{1}{2}° \pm \frac{1}{2}°$ with a compatible end relief angle of $1\frac{1}{2}° \pm \frac{1}{2}°$ and a side cutting negative rake angle and side relief angle of $1\frac{1}{2}° \pm \frac{1}{2}°$. Further, it has been found possible to achieve satisfactory results with a back rake angle of up to 4°.

Contrary to all industry-accepted relief angle minimums, a 1° to 2° angle has been successfully used in finish turning bearing journals to an unexpected degree of quality heretofore believed impossible with indexible cutting tool inserts of this type.

The cutting tool insert is also positioned by the tool holder with a side cutting edge angle of 3° to protect the working tips by having first contact with the journal about the center of the insert. This area of the insert has better support backing and by reason of a limited depth chip-breaker formed adjacent the cutting edges, is strongest through this area. Since a minimum of cutting is performed in this area an commersurate with the minimum service, a limited depth chip-breaker may be utilized.

Further, while a nose cutting radius formed at the working tips of the multi-sided insert produces a desirable contoured fillet cut adjoining the journal bearing surface, a pair of cutting flats incorporated in the nose radius, and only slightly modifying the contour thereof, make available an operable cutting edge flat with each indexible position of the insert for finish turning the journal bearing surfaces. Stepped chip-breakers provided at the nose areas of the insert intersect the chip-breakers for the side cutting edges and are arranged to prevent the formation of long, continuous chips produced by the adjacent cutting edges. These nose area chip-breakers are formed more deeply into the insert than the other chip-breakers to provide the most effective breaking means at the location of greatest need. Further, the nose area chip-breakers at the intersection with the chip-breakers for the side cutting edges provide additional stepped portions extending across the nose area and serve to complement the major chip-breaking work performed by the stepped portion having the greatest offset.

The present invention overcomes the difficulties and disadvantages of turning tools with carbide inserts used in the past in that it is particularly adapted for finish turning high quality journal bearing surfaces with a high degree of accuracy and efficiency.

Another advantage of the present invention is that a single indexible insert is provided having a plurality of cutting edges each of which are positionable to perform a complete journal finish turning operation.

Yet another advantage of the present invention is that a carbide insert is provided having a plurality of selectively operable cutting edge portions with a cooperating chip-breaker for each cutting edge portion and positioned for maximum effectiveness.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a fragmentary sectional view of a railway car axle showing a turning cutter tool constructed in accordance with the concepts of the present invention, disposed in various cutting positions for finish turning a right-hand bearing journal surface;

FIG. 2 is a fragmentary sectional view of an opposite end of the axle shown in FIG. 1 showing a turning tool in position to finish turn a left-hand bearing journal surface;

FIG. 3 is a sectional view taken along the line III—III of FIG. 1 and showing the turning tool in an operable cutting position;

FIG. 4 is a diagrammatic view of an indexible insert in the cutting position shown in FIG. 3;

FIG. 5 is a diagrammatic view similar to FIG. 4, but showing a prior art form of carbide tipped turning tool;

FIG. 6 is a diagrammatic view similar to FIG. 5, but showing another form of the prior art utilizing an indexible carbide insert;

FIG. 7 is a plan view of a preferred form of the present invention;

FIG. 8 is a side elevational view of the turning tool shown in FIG. 7;

FIG. 9 is a cutting end elevational view of the turning tool of FIG. 8;

FIG. 10 is a plan view drawn to an enlarged scale of the carbide insert for the turning tool shown in FIG. 7;

FIG. 11 is a side elevational view of the insert of FIG. 10; and

FIG. 12 is a fragmentary plan view at a greatly enlarged scale of a nose cutting portion of the insert shown in FIG. 10.

DESCRIPTION OF THE PREFERRED EMBODIMENT

Referring to the drawings, the turning tool of this invention, indicated generally at 20, comprises a tool holder 22 and a carbide cutting tool insert 23 adapted to produce high quality journal finishes on a wheel axle 24. The tool holder 22 comprises an elongated shank portion 25 for affixing in a supporting slot 27 of a tool support means 26 of a lathe compound or other cutting feed, by a securing means 28 with a recess 32 formed in a forward end of the tool holder 22 to receive the insert 23 at a specific cutting orientation in conformity with the concepts of this invention. The insert 23 is retained in the recess 32 on a compound angled supporting surface 34 and against abutting surface 36 by a securing means 38. A spacer or shim 40, as shown in FIG. 3, may be interposed between the insert 23 and the supporting surface 34, but is not essential to the performance of the turning tool 20. The elimination of the spacer 40 would merely require forming a shallower recess in the tool holder 22 to receive the insert directly on the supporting surface 34 as is shown in FIG. 4.

As best seen in FIG. 1, the turning tool 20 is fed inward from the broken line position by the compound 26 while cutting with a side cutting edge portion 42 of the insert 23, a flange face 44 of the axle 24. The axle 24 being suitably chucked and rotatably driven by a lathe (not shown) in a conventional manner, the turning tool 20 is advanced to the solid line position wherein a nose cutting edge portion 46 produces a fillet adjoining a bearing journal surface 48 of the axle 24. Thereafter, the cutting feed, tool support means 26 advances the turning tool 20 laterally across the journal surface 48 in a finishing cut operation and terminating with a backward pivot of the tool holder 22 about an axis 50, to provide a radius at the inner end of the journal remote from the flange face 44.

FIG. 2 shows the insert 23 mounted in the recess 32' of a left-hand tool holder 22' to finish cut outside journals on the opposite end of the axle 24 with the same axle set-up.

Now with specific reference to FIGS. 3 and 4 of the drawings, it may be observed that each cutting edge lip angle $la$ of the insert 23 comprises a 90° angle, providing a mechanically strong cutting edge. On the other hand, the lip angle $la$ of prior art carbide tipped turning tools shown in FIG. 5 utilizes a considerably smaller lip angle with a weakened cutting edge. This design provides a desirable zero back rake angle with a substantial relief angle $ra$, however, since the carbide tip is brazed to the tool holder, this design does not provide the advantages of an indexible insert. FIG. 6 shows an indexible insert of the prior art with a 90° lip angle $la$ which is also provided with a substantial relief angle $ra$ (previously believed to be essential to a workable design) but with a resulting negative back rake angle $\theta$ too severe for machining bearing journal surfaces.

Again with reference to FIGS. 3 and 4 of the drawings, the present invention provides a minimal negative back rake angle $\theta$ preferably $1\frac{1}{2}°\pm\frac{1}{2}°$, which has unexpectedly produced high quality journal surfaces, unaffected by minimum clearance associated with the reduced relief angle $ra$, fixed at $1\frac{1}{2}°\pm\frac{1}{2}°$ by the setting of the back rake angle. The supporting surface 34 and abutting surface 36 of the tool holder recess 32 provide this orientation and also provide a side cutting negative rake angle $\beta$ of $1\frac{1}{2}°\pm\frac{1}{2}°$ by which the side cutting relief angle $ra$ is established at $1\frac{1}{2}°\pm\frac{1}{2}°$. It may be further seen from FIGS. 7 and 10 that the tool holder surface 36 also fixes the insert 23 in the recess 32 at a side cutting angle $\alpha$ of 3° to protect the major cutting edges at the nose area.

Each insert 23 includes a pair of spaced parallel mounting faces 52, 52 (FIG. 11) having a generally triangular configuration, with side walls 54 disposed at uniform angles relative to one another and extending perpendicularly between the parallel mounting faces 52, 52 to form right-angled cutting edges 42 at the juncture of each paralled mounting face 52 and side wall 54. Each side wall 54 is interconnected with an adjacent side wall by a nose radius 56 having the nose cutting edge portions 46 formed at the juncture with each of the parallel mounting surfaces 52, 52. A pair of cutting flats 58, 58 are formed into each nose radius 56 providing a pair of spaced cutting edge flats 59, 59 at the juncture with the mounting faces 52, 52. The cutting edge flats 59 are indexibly positioned in a finish turning position (as best seen in FIGS. 7 and 10) by the abutting surface 36 of the recess 32.

In the preferred embodiment of the invention the insert 23 is provided with chip-breaker means 60 comprising stepped offsets in the mounting surfaces 52, 52 to form chip-breakers 62 extending across each nose radius portion 56, and comprising adjacent stepped, side cutting chip-breakers 64 extending along each of the side walls 54 to intersect with the nose area chip-breakers 62, which are formed at a greater depth in the mounting surface 52 than the chip-breakers 64. Herein, additional stepped portion extensions 66, 66 are provided to the nose area chip-breakers 62. The major chip-breaking action is performed by a center portion 68 of the chip-breaker 62 having the greatest stepped offset while the extensions 66 serve to complement the breaking process at locations of lesser need. Further, the shallower chip-breakers 64 provide adequate breaking action during the side cutting operation while providing a thicker, stronger side wall 54 in the area of initial cutting contact with the journal.

Thus, it has been shown that each cutting edge portion is provided with an associated chip-breaker to reduce continuous ribbons of metal, generated by the cutting action, into short, manageable chips for more convenient disposal. Further, the triangular insert will accommodate both right and left-hand journal finishing operations with a plurality of cutting edges being indexibly positioned to make readily available a new, sharp cutting edge, as required, to produce a high quality bearing journal surface.

I claim as my invention:

1. In a turning tool for use in a lathe having a lathe cutting feed support;

a selectably indexible cutting tool insert, a tool holder for said cutting tool insert having an elongated generally horizontally extending shank, said tool holder being mounted on and moved by said lathe cutting feed support for inward and lateral cutting movement relative to a journal, and having a mounting recess formed in one end thereof facing upwardly and toward the work to be turned during a normal operation of the cutting tool and having compound angled mounting surfaces at the base of said recess for positioning the cutting tool insert in an operative orientation, means accessible from the top of said cutting tool insert within the limits of said insert and having interengagement with said tool holder and engaging said cutting tool insert for fixedly securing said cutting tool insert to said recess, said cutting tool insert having parallel selectable mounting surfaces whereby the insert may be indexibly rotated and overturned to provide a plurality of operable cutting edges and having a plurality of side walls disposed at uniform angles relative to each other and extending perpendicular to said parallel mounting surfaces, each side wall being interconnected by a nose-cutting radius having a pair of spaced cutting flats formed thereon and extending between the parallel mounting surfaces with one of said cutting flats disposed in a forward cutting position in each indexible position of the cutting tool inserted and providing a finish cutting flat extending parallel to the direction of lateral feed movement of the cutting tool, each parallel mounting surface of the insert including a stepped nose chip breaker formed adjacent the nose-cutting radius for cooperation therewith and with said cutting edge flats and a stepped chip breaker extending along each side wall of the cutting tool insert for cooperation therewith between a pair of nose chip breakers, said stepped chip breakers extending along side walls being disposed at different elevational levels relative to said nose chip breakers to provide a stepped relationship therebetween.

2. The invention of claim 13 wherein the negative back rake and the negative side rake are in the order of 1° to 2° and the end relief angle and the side relief angle are established in the range of 1° to 2°.

3. An indexible carbide cutting tool insert comprising a pair of parallel spaced mounting surfaces and three side walls disposed at uniform angles relative to one another and extending perpendicularly between said parallel mounting surfaces and forming cutting edges at the juncture of each face and side wall, each side wall being joined to an adjacent side wall by a nose-cutting radius with each nose-cutting radius having a pair of spaced cutting flats formed thereon and extending between the parallel mounting surfaces and providing a cutting edge flat at the juncture with each parallel mounting surface, each parallel mounting surface of the cutting tool insert including a stepped nose chip breaker formed adjacent each nose-cutting radius and parallel to the planes of said parallel mounting surfaces, a stepped chip breaker formed along each side wall for cooperation therewith parallel to the planes of said parallel mounting surfaces and extending between each pair of said nose chip breakers, said nose chip breakers and said chip breakers formed along said mounting surfaces and extending along said side walls being disposed at different elevational levels to provide a stepped relationship therebetween.

* * * * *